(12) United States Patent
Gao et al.

(10) Patent No.: US 11,507,776 B2
(45) Date of Patent: Nov. 22, 2022

(54) IMAGE RECOGNITION METHOD FOR DETECTION TASKS BASED ON SINGLE CONVOLUTIONAL NEURAL NETWORK AND IMAGE RECOGNITION SYSTEM THEREOF

(71) Applicant: Industrial Technology Research Institute, Hsinchu (TW)

(72) Inventors: De-Qin Gao, Yunlin County (TW); Peter Chondro, Surabaya (ID); Mei-En Shao, Taichung (TW); Shanq-Jang Ruan, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 23 days.

(21) Appl. No.: 16/950,919

(22) Filed: Nov. 18, 2020

(65) Prior Publication Data
US 2022/0114383 A1     Apr. 14, 2022

(30) Foreign Application Priority Data
Oct. 14, 2020   (TW) ................................ 109135458

(51) Int. Cl.
*G06K 9/62*     (2022.01)
*G06T 7/10*     (2017.01)
(Continued)

(52) U.S. Cl.
CPC .............. *G06K 9/6232* (2013.01); *G06T 7/10* (2017.01); *G06T 7/73* (2017.01); *G06T 11/00* (2013.01);
(Continued)

(58) Field of Classification Search
CPC ........... G06K 9/6232; G06T 7/10; G06T 7/73; G06T 11/00; G06T 2207/20084; G06T 2210/12; G06V 10/40
See application file for complete search history.

(56) References Cited

U.S. PATENT DOCUMENTS 9,286,524 B1    3/2016  Mei et al.
9,836,853 B1 *  12/2017 Medioni ................. G06N 3/04
(Continued)

FOREIGN PATENT DOCUMENTS

CN    107704866    2/2018
CN    109145713    1/2019
(Continued)

OTHER PUBLICATIONS

C. Kumar B., R. Punitha and Mohana, "YOLOv3 and YOLOv4: Multiple Object Detection for Surveillance Applications," 2020 Third International Conference on Smart Systems and Inventive Technology (ICSSIT), 2020, pp. 1316-1321, doi: 10.1109/ICSSIT48917.2020.9214094.*
(Continued)

*Primary Examiner* — Shefali D Goradia
(74) *Attorney, Agent, or Firm* — JCIPRNET (57) ABSTRACT

An image recognition method, including: obtaining an image to be recognized by an image sensor; inputting the image to be recognized to a single convolutional neural network; obtaining a first feature map of a first detection task and a second feature map of a second detection task according to an output result of the single convolutional neural network, wherein the first feature map and the second feature map have a shared feature; using an end-layer network module to generate a first recognition result corresponding to the first detection task from the image to be recognized according to the first feature map, and to generate a second recognition result corresponding to the sec-
(Continued)

ond detection task from the image to be recognized according to the second feature map; and outputting the first recognition result corresponding to the first detection task and the second recognition result corresponding to the second detection task.

16 Claims, 12 Drawing Sheets (51) Int. Cl.
  *G06T 11/00* (2006.01)
  *G06T 7/73* (2017.01)
  *G06V 10/40* (2022.01)

(52) U.S. Cl.
  CPC .... *G06V 10/40* (2022.01); *G06T 2207/20084* (2013.01); *G06T 2210/12* (2013.01)

(56) References Cited

U.S. PATENT DOCUMENTS

| | | | |
|---|---|---|---|
| 10,445,622 | B2 | 10/2019 | Kicanaoglu et al. |
| 10,699,430 | B2 * | 6/2020 | Chondro ............... G06T 7/593 |
| 2016/0350930 | A1 | 12/2016 | Lin et al. |
| 2018/0341495 | A1 * | 11/2018 | Culurciello .......... G06N 3/08 |
| 2019/0072977 | A1 * | 3/2019 | Jeon .................. G06K 9/6296 |
| 2019/0130250 | A1 * | 5/2019 | Park ..................... G06N 5/046 |
| 2019/0205643 | A1 | 7/2019 | Liu et al. |
| 2019/0286921 | A1 * | 9/2019 | Liang ................ G06F 16/587 |
| 2020/0082560 | A1 | 3/2020 | Nezhadarya et al. |
| 2020/0286383 | A1 | 9/2020 | Tran et al. |
| 2020/0394413 | A1 * | 12/2020 | Bhanu ................. A63B 69/002 |
| 2021/0276574 | A1 * | 9/2021 | Efrat Sela ............. G06N 3/08 |

FOREIGN PATENT DOCUMENTS

| | | |
|---|---|---|
| CN | 110570421 | 12/2019 |
| CN | 110837869 | 2/2020 |
| CN | 110909885 | 3/2020 |
| CN | 111160367 | 5/2020 |
| CN | 111582043 | 8/2020 |
| JP | 2020503604 | 1/2020 |
| TW | 201814591 | 4/2018 |
| WO | 2017015390 | 1/2017 |
| WO | 2019102796 | 5/2019 |
| WO | 2020057758 | 3/2020 |
| WO | 2020090428 | 5/2020 |
| WO | WO-2021164887 A1 * | 8/2021 |

OTHER PUBLICATIONS

Wei Liu, et al."SSD: Single Shot MultiBox Detector", arXiv:1512.02325v5, Dec. 29, 2016, pp. 1-17.
Adam Paszke, et al."ENet: A Deep Neural Network Architecture for Real-Time Semantic Segmentation", arXiv:1606.02147v1, Jun. 7, 2016, pp. 1-10.
Shinpei Kato, et al."An Open Approach to Autonomous Vehicles", IEEE Micro, vol. 35, No. 6, Dec. 29, 2015, pp. 60-68.
H. Fujiyoshi, et al."Deep learning-based image recognition for autonomous driving", IATSS Research, vol. 43, No. 4, Dec. 6, 2019, pp. 244-252.
Jonathan Long, et al."Fully Convolutional Networks for Semantic Segmentation" 2015 IEEE Conference on Computer Vision and Pattern Recognition (CVPR)], Jun. 7-12, 2015, pp. 3431-3440.
Shaoqing Ren, et al.,"Faster R-CNN: Towards real-time object detection with region proposal networks" arXiv:1506.01497v3, Jan. 6, 2016, pp. 1-14.
Andreas Geiger, et al., "Are we ready for Autonomous Driving? The KITTI Vision Benchmark Suite" 2012 IEEE Conference on Computer Vision and Pattern Recognition, Jun. 16-21, 2012, pp. 3354-3361.
Joseph Redmon, et al.,"Yolov3: An incremental improvement" arXiv:1804.02767v1, Apr. 8, 2018, pp. 1-6.
Office Action of Taiwan Counterpart Application, dated Jan. 21, 2022, pp. 1-7.

* cited by examiner

IMAGE RECOGNITION METHOD FOR DETECTION TASKS BASED ON SINGLE CONVOLUTIONAL NEURAL NETWORK AND IMAGE RECOGNITION SYSTEM THEREOF

CROSS-REFERENCE TO RELATED APPLICATION

This application claims the priority benefit of Taiwan application no. 109135458, filed on Oct. 14, 2020. The entirety of the above-mentioned patent application is hereby incorporated by reference herein and made a part of this specification.

TECHNICAL FIELD

The disclosure relates to an image recognition method and an image recognition system.

BACKGROUND

In the field of image recognition, neural networks have been widely used. However, different types of recognitions often require different neural network architectures. Therefore, traditionally, the recognition of multiple features requires the construction of multiple sets of neural networks. How to use a single neural network architecture to recognize multiple features to improve performance is the goal of those skilled in the art.

SUMMARY

The disclosure provides an image recognition method and an image recognition system, which can simultaneously output recognition results corresponding to different detection tasks according to obtained features.

The disclosure provides an image recognition method for a plurality of detection tasks. The image recognition method includes: obtaining an image to be recognized by an image sensor; inputting the image to be recognized to a single convolutional neural network; obtaining a first feature map of a first detection task and a second feature map of a second detection task according to an output result of the single convolutional neural network, wherein the first feature map and the second feature map have a shared feature; using an end-layer network module to generate a first recognition result corresponding to the first detection task from the image to be recognized according to the first feature map, and to generate a second recognition result corresponding to the second detection task from the image to be recognized according to the second feature map; and outputting the first recognition result corresponding to the first detection task and the second recognition result corresponding to the second detection task.

The disclosure provides an image recognition system, which includes an image sensor, a storage device, an output device and a processor. The image sensor obtains an image to be recognized. The processor is coupled to the image sensor, the storage device and the output device. The processor inputs the image to be recognized to a single convolutional neural network. The storage device stores the single convolutional neural network. The processor obtains a first feature map belonging to a first detection task and a second feature map belonging to a second detection task according to an output result of the single convolutional neural network, wherein the first feature map and the second feature map have a shared feature. The processor uses an end-layer network module to generate a first recognition result corresponding to the first detection task from the image to be recognized according to the first feature map, and to generate a second recognition result corresponding to the second detection task from the image to be recognized according to the second feature map. The output device outputs the first recognition result corresponding to the first detection task and the second recognition result corresponding to the second detection task.

Based on the above, the image recognition method and system of the exemplary embodiments of the disclosure can obtain the recognition results of different detection tasks by using the single convolutional neural network.

To make the aforementioned more comprehensible, several embodiments accompanied with drawings are described in detail as follows.

DETAILED DESCRIPTION

Figure 1:
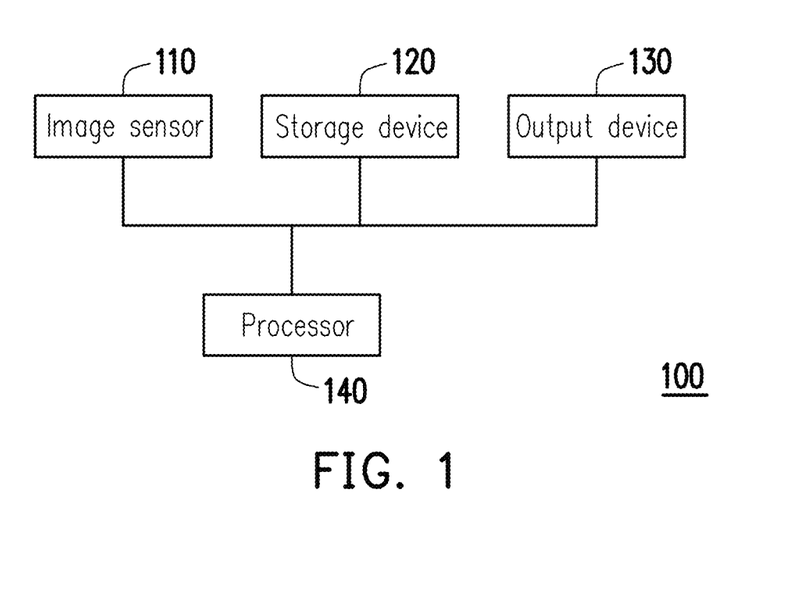
FIG. 1 is a block diagram illustrating an image recognition system according to an exemplary embodiment of the disclosure.

FIG. 1 is a block diagram illustrating an image recognition system according to an exemplary embodiment of the disclosure.

Referring to FIG. 1, an image recognition system 100 is configured to execute an image recognition method described in the disclosure, so as to use a single convolutional neural network to obtain recognition results of different detection tasks. The image recognition system 100 may be, for example, a mobile device, a personal digital assistant (PDA), a notebook computer, a tablet computer, a general desktop computer or other electronic device, which is not limited herein.

The image recognition system 100 includes an image sensor 110, a storage device 120, an output device 130 and a processor 140.

The image sensor 110 is configured to obtain an image to be recognized. In this exemplary embodiment, the image sensor 110 is, for example, a camcorder or a camcorder of a camera of a mobile device.

The storage device 120 is configured to store the single convolutional neural network, the image to be recognized and the recognition results. In this exemplary embodiment, the storage device 120 may be, for example, a fixed or a movable device in any possible forms including a random access memory (RAM), a read-only memory (ROM), a flash memory, a hard drive or other similar devices, or a combination of the above-mentioned devices.

The output device 130 is a device or an element configured to output an image recognition result. The output device 130 is, for example, a display. For instance, when the image to be recognized is a road image (e.g., including images of trees, vehicles and pedestrians), the output device 130 can output the images of trees, vehicles and pedestrians in image to be recognized according to the image recognition method of the disclosure.

The processor 140 is coupled to the image sensor 110, the storage device 120 and the output device 130 to control operations of the image recognition system 100. In this exemplary embodiment, the processor 140 is, for example, a processor for general purposes, a processor for special purposes, a conventional processor, a data signal processor, a plurality of microprocessors, one or more microprocessors, controllers, microcontrollers and Application Specific Integrated Circuit (ASIC) which are combined to a core of the digital signal processor, a Field Programmable Gate Array (FPGA), any other integrated circuits, a state machine, a processor based on Advanced RISC Machine (ARM) and similar products.

In this exemplary embodiment, the processor 140 can run an image recognition module based on the single convolutional neural network to perform recognitions of multiple detection tasks at the same time.

Figure 2:
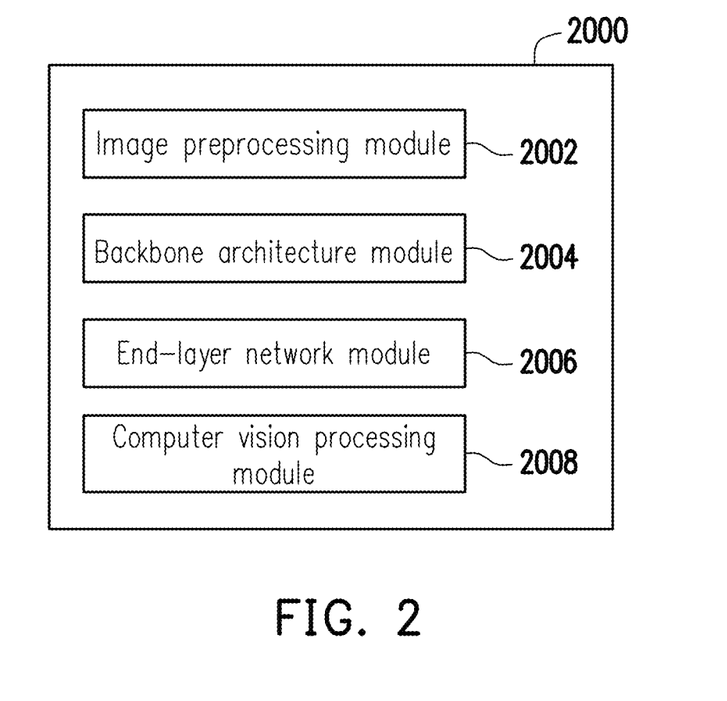
FIG. 2 is a block diagram illustrating an image recognition module based on a single convolutional neural network according to an exemplary embodiment of the disclosure.

FIG. 2 is a block diagram illustrating an image recognition module based on a single convolutional neural network according to an exemplary embodiment of the disclosure.

Referring to FIG. 2, an image recognition module 2000 based on a single convolutional neural network includes an image preprocessing module 2002, a backbone architecture module 2004, an end-layer network module 2006 and a computer vision processing module 2008.

In this exemplary embodiment, the processor 140 runs the image preprocessing module 2002 to perform a preprocessing on the image to be recognized obtained by the image sensor 110.

Figure 3:
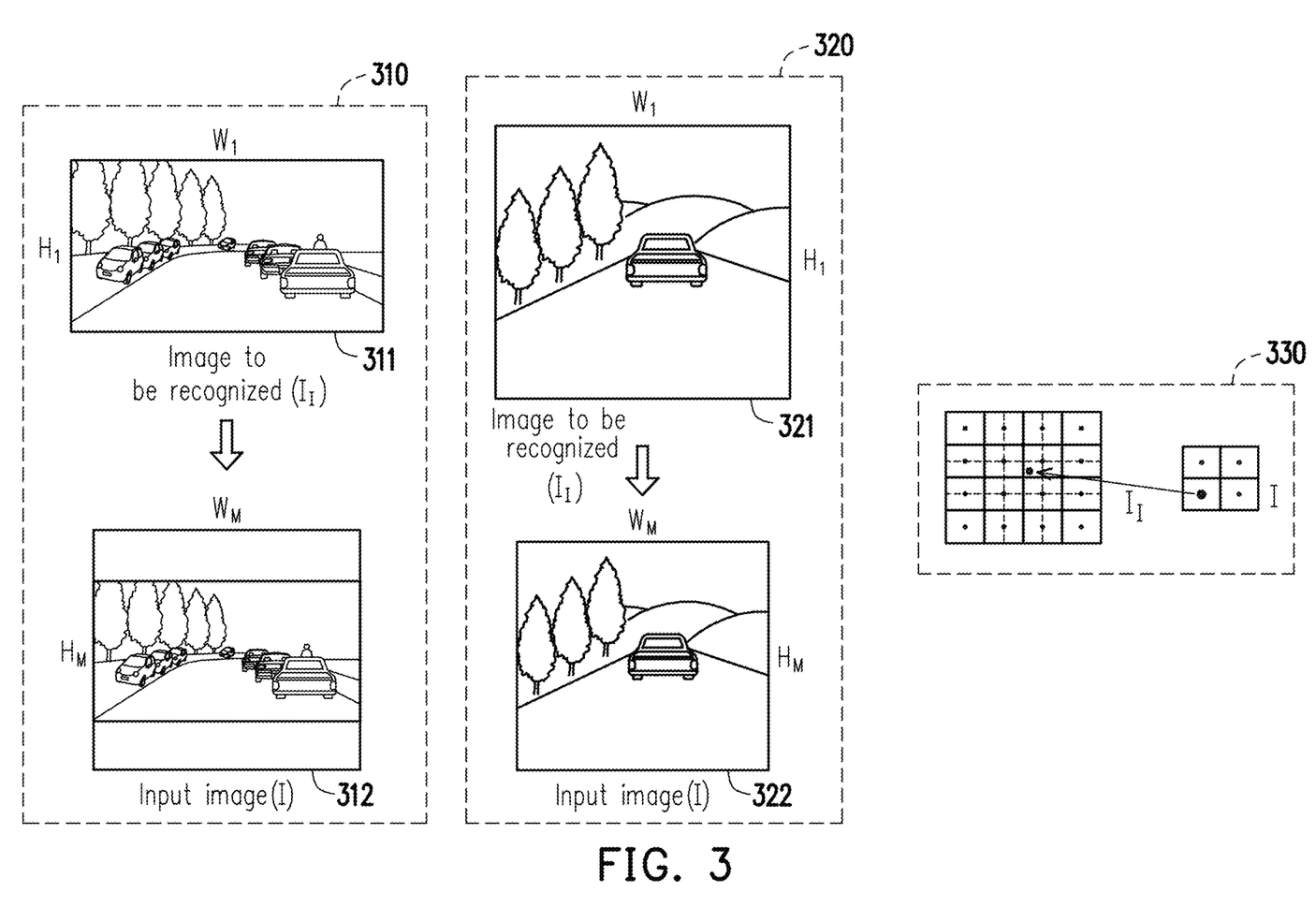
FIG. 3 is a schematic diagram illustrating an image preprocessing according to an exemplary embodiment of the disclosure.

FIG. 3 is a schematic diagram illustrating an image preprocessing according to an exemplary embodiment of the disclosure.

Referring to FIG. 3, the image preprocessing module 2002 can normalize the length and width dimensions of the image to be recognized (e.g., a raw image 311 or a raw image 321) to the dimensions of the neural network model.

Specifically, it is assumed that the dimensions of the neural network model include a width $W_M$ and a height $H_M$, as shown by an image padding in an operation 310 in FIG. 3. The image preprocessing module 2002 performs the image padding on the raw image 311 (with a width $W_I$ and a height $H_I$) to adjust an aspect ratio of the image to obtain an input image 312.

Further, in another example, as shown by an operation 320 and an operation 330 and Formula 1 below, the image preprocessing module 2002 can also resize the raw image 321 by using a bicubic interpolation to obtain an input image 322.

$$I(u,v)=\Sigma_{x,y=0}^{3} a_{xy} I_f(u^x, v^y) \quad \text{(Formula 1)}$$

Referring to FIG. 2, the backbone architecture module 2004 is configured to extract features of the image to be recognized, and the end-layer network module 2006 is configured to perform multiple detection tasks and recognitions according to feature maps output by the backbone architecture module 2004.

Specifically, the backbone architecture module 2004 is configured with a plurality of convolution layers in the single convolutional neural network, and the processor 140 runs the backbone architecture module 2004 to extract features corresponding to the detection tasks from the image to be recognized, so as to generate the feature maps. Then, the processor 140 runs the end-layer network module 2006 to perform the detection tasks and recognitions.

In this exemplary embodiment, for example, a first detection task is a 2D object detection task, and a second detection task is an image segmentation detection task. Accordingly, the backbone architecture module 2004 outputs a first feature map corresponding to the first detection task and a second feature map corresponding to the second detection task, and the end-layer network module 2006 performs an object detection for the first detection task and a point detection for the second detection task according to the feature maps.

Figure 4:
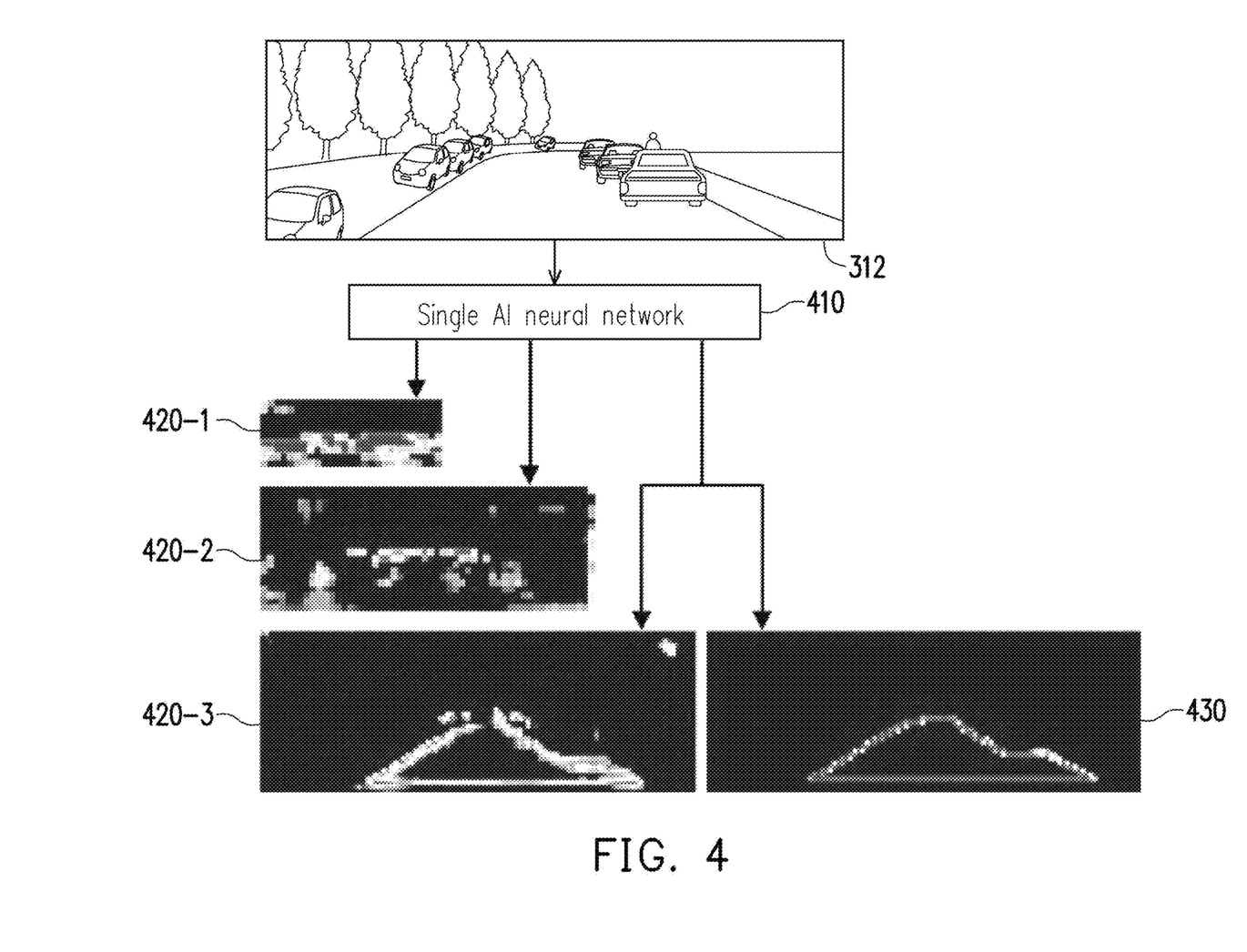
FIG. 4 is a schematic diagram illustrating feature maps obtained for different detection tasks according to an exemplary embodiment of the disclosure.

FIG. 4 is a schematic diagram illustrating feature maps obtained for different detection tasks according to an exemplary embodiment of the disclosure.

Referring to FIG. 4, after inputting the input image 312 to the backbone architecture module 2004, the processor 140 can obtain first feature maps 420-1, 420-2 and 420-3 of the first detection task and a second feature map 430 of the second detection task from a single convolutional neural network 410 configured in the backbone architecture module 2004, In particular, the processor 140 can use the backbone architecture module 2004 having the convolution layers to extract a shared feature of the first feature maps 420-1, 420-2 and 420-3 of the first detection task and the second feature map 430 of the second detection task from the image to be recognized (e.g., the input image 312), and to accordingly generate a shared feature map of the first feature maps 420-1, 420-2 and 420-3 of the first detection task and the second feature map 430 of the second detection task.

For example, in this exemplary embodiment, because the first detection task is the 2D object detection task, the first feature map of the first detection task can include coordinates of a bounding box, a width and a height of the bounding box, a detection confidence level of the bounding box and a class probability of the bounding box. Because the second detection task is the image segmentation detection task, the second feature map of the second detection task can include the coordinates of the bounding box, the detection confidence level of the bounding box and the class probability of the bounding box.

Referring to FIG. 2, the computer vision processing module 2008 is configured to perform the point detection according to information of the feature map. Specifically, in order to perform an image segmentation detection correctly, in this exemplary embodiment, the processor 140 runs the computer vision processing module 2008 to perform a computer vision-based processing according to information of the second feature map of the second detection task.

Figure 5:
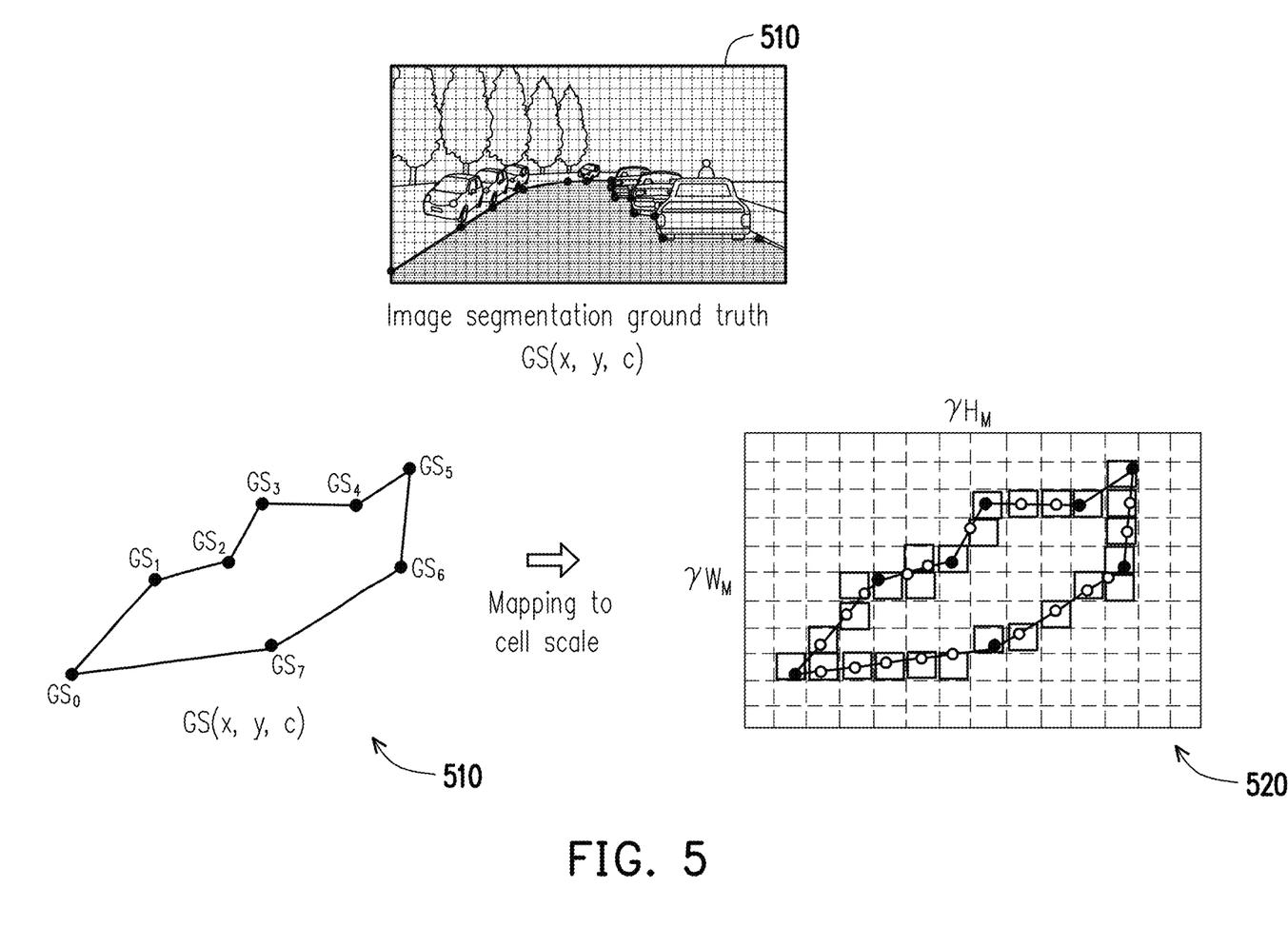
FIG. 5 is a schematic diagram illustrating a grid map obtained by using a computer vision technique according to an exemplary embodiment of the disclosure.

FIG. 5 is a schematic diagram illustrating a grid map obtained by using a computer vision technique according to an exemplary embodiment of the disclosure.

Referring to FIG. 5, the computer vision processing module 2008 can obtain a corresponding image segmentation ground truth (i.e., an image segmentation ground truth 510) from the input image (i.e., the input image 312) according to the feature map generated by the backbone architecture module 2004.

As shown in FIG. 5, the image segmentation ground truth 510 includes points $GS_0$, $GS_1$, $GS_2$, $GS_3$, $GS_4$, $GS_5$, $GS_6$ and $GS_7$. It is assumed that the dimensions of the neural network model include the width $W_M$ and the height $H_M$, and $\gamma$ is a scaler of a cell map. In a grid map 520, cells including the points $GS_0$, $GS_1$, $GS_2$, $GS_3$, $GS_4$, $GS_5$, $GS_6$ and $GS_7$ may be regarded as positive data, and cells not including the points $GS_0$, $GS_1$, $GS_2$, $GS_3$, $GS_4$, $GS_5$, $GS_6$ and $GS_7$ may be temporarily regarded as negative data. Next, by using the Formula 2 and Formula 3 below, the computer vision processing module 2008 can calculate a vector analysis between neighboring points $GS_n$ and $GS_{n+1}$.

$$\Delta x = \frac{GS_{n+1}(x) - GS_n(x)}{\sqrt{(GS_{n+1}(x) + GS_n(x))^2 + (GS_{n+1}(y) + GS_n(y))^2}} \quad \text{(Formula 2)}$$

$$\Delta y = \frac{GS_{n+1}(y) - GS_n(y)}{\sqrt{(GS_{n+1}(x) + GS_n(x))^2 + (GS_{n+1}(y) + GS_n(y))^2}} \quad \text{(Formula 3)}$$

After calculating the vector analysis between the neighboring points $GS_n$ and $GS_{n+1}$, the processor 140 can repeatedly execute $GS_n = GS_N + \Delta xy$ on each $GS_n \leq GS_{n+1}$ and convert all points that first encounter negative cell data to the positive data. In this way, the processor 140 can obtain a positive data grid map 520 from the image segmentation ground truth 510. That is, the positive data grid map 520 with all cells including the points $GS_0$, $GS_1$, $GS_2$, $GS_3$, $GS_4$, $GS_5$, $GS_6$ and $GS_7$ may be obtained.

Figure 6:
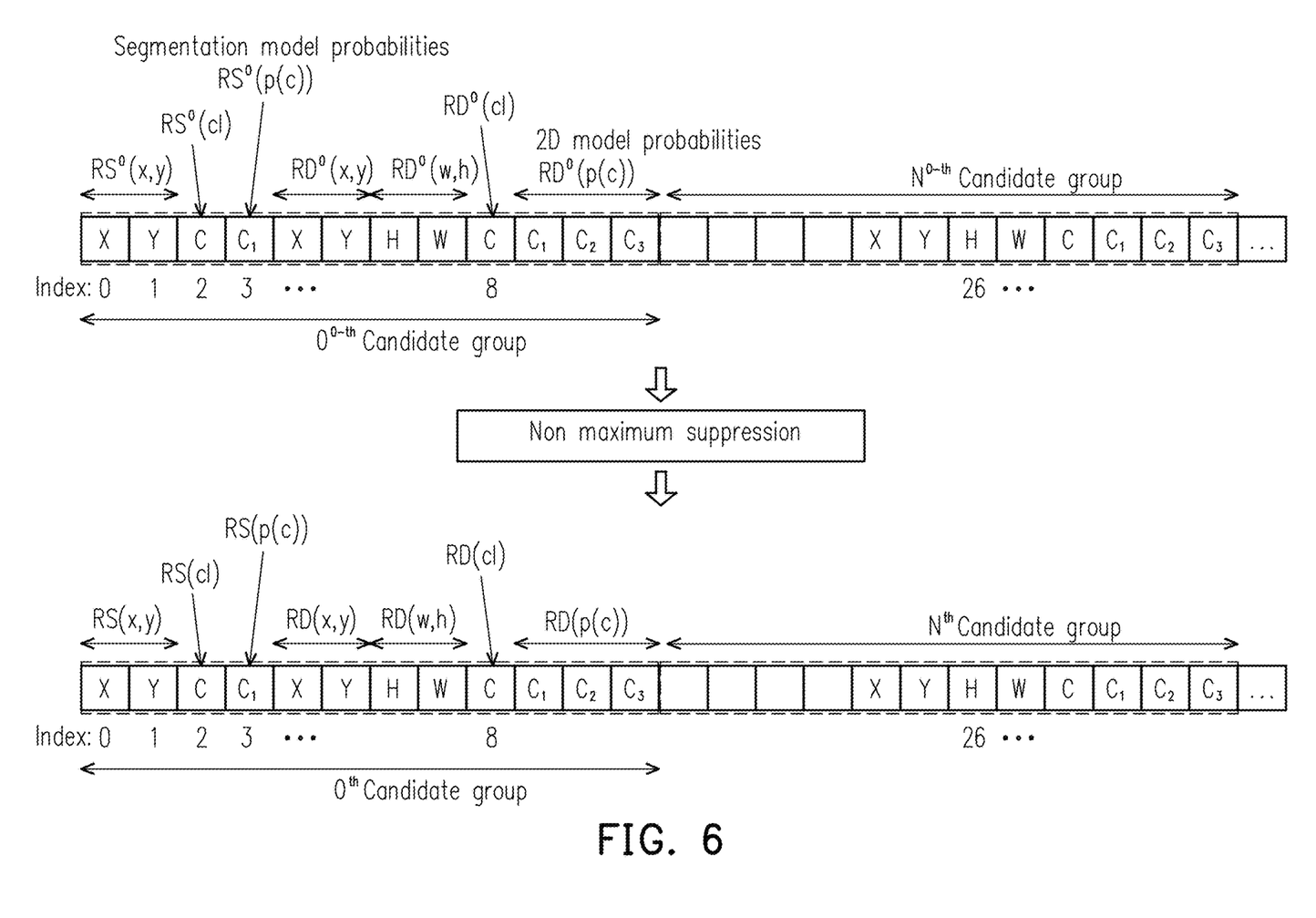
FIG. 6 is a schematic diagram illustrating a first feature map and a second feature map according to an exemplary embodiment of the disclosure.

FIG. 6 is a schematic diagram illustrating a first feature map and a second feature map according to an exemplary embodiment of the disclosure.

Referring to FIG. 6, the second feature map (point candidates $RS^0(x, y, cl, p)$) may include coordinates (x, y) of a bounding box, a detection confidence level cl of the bounding box and a class probability p of the bounding box. The first feature map (detection box candidates $RD^0(x, y, w, h, cl, p)$) may include the coordinates (x, y) of the bounding box, a width w and a height h of the bounding box, the detection confidence level cl of the bounding box and the class probability p of the bounding box. After the point candidates $RS^0(x, y, cl, p)$ and the detection box candidates $RD^0(x, y, w, h, cl, p)$ are arranged into an array as shown in FIG. 6, a non maximum suppression (NMS) technique may be used to remove the point candidates and detection box candidates with low confidence levels. In this way, point predictions (RS(x, y, c, cl, p)) and detection box predictions (RD(x, y, w, h, c, cl, p)) may be generated.

In an exemplary embodiment, a first loss function may be configured for the first detection task, and a second loss function may be configured for the second detection task. The first loss function is configured to measure an error between a first recognition result and a first reference result corresponding to the first detection task, and the second loss function is configured to measure an error between a second recognition result and a second reference result corresponding to the second detection task.

Figure 7:
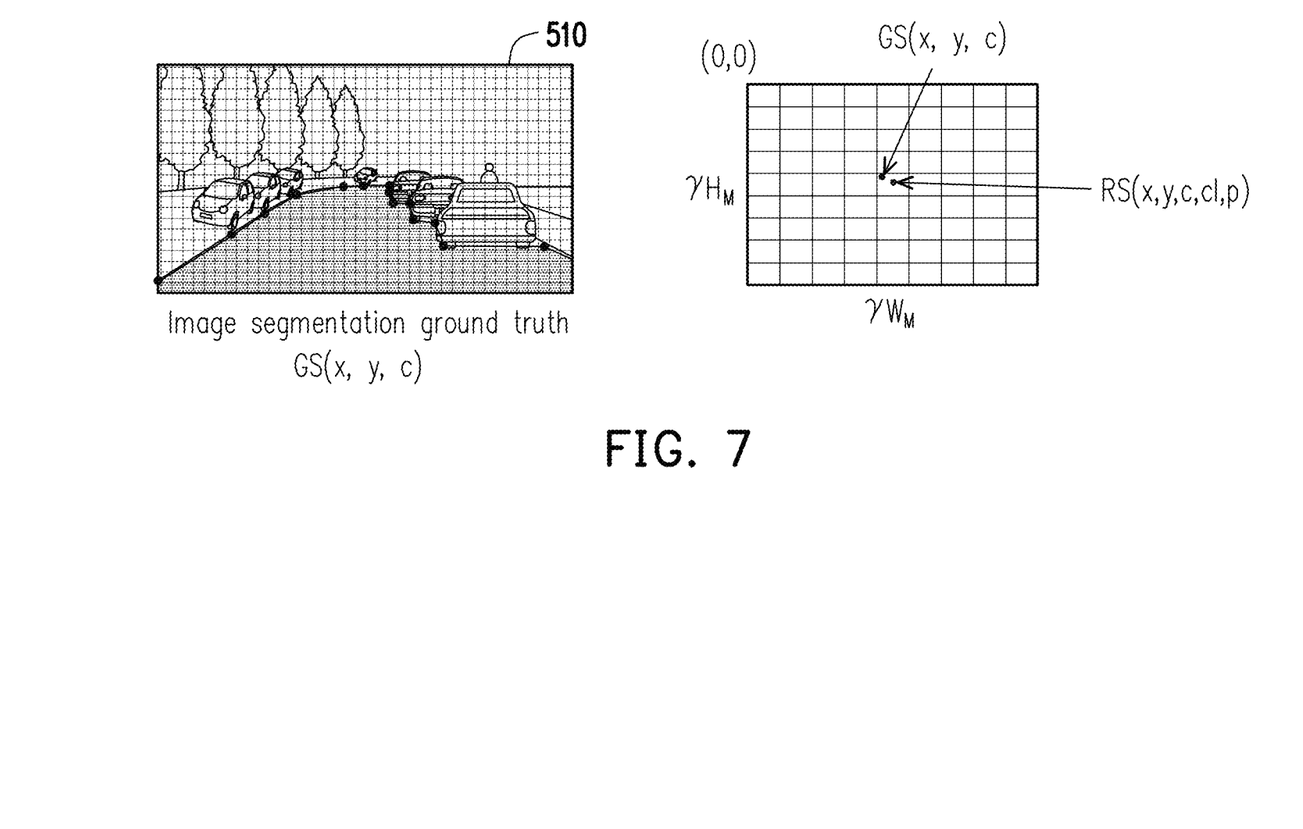
FIG. 7 is a schematic diagram illustrating inputs for a first loss function according to an exemplary embodiment of the disclosure.

FIG. 7 is a schematic diagram illustrating inputs for a first loss function according to an exemplary embodiment of the disclosure.

According to the image segmentation ground truth 510 (i.e., GS(x,y,c)) and the point predictions RS(x, y, c, cl, p) generated by the method shown in FIG. 6, The first loss function (a segmentation loss $Seg_{loss}$) can measure the error between the first recognition result (the point predictions RS(x, y, c, cl, p)) and the first reference result (the image segmentation ground truth 510, i.e., GS(x,y,c)) corresponding to the first detection task. $Seg_{loss}$ may be obtained through Formula 4 to Formula 7 below.

$$xy_{loss}^{seq} = \lambda pt \sum_{i=0}^{\gamma w_M \times \gamma H_M} \mathbb{I}_i^{pt}\left((RS_i(x) - GS_i(x))^2 + (RS_i(y) - GS_i(y))^2\right) \quad \text{(Formula 4)}$$

$$c_{loss}^{seq} = \sum_{i=0}^{\gamma w_M \times \gamma H_M} \mathbb{I}_i^{pt}\left(\sum_{c \in classes} (RS_i(p(c)) - GS_i(p(c)))^2\right) \quad \text{(Formula 5)}$$

$$cl_{loss}^{seq} = \sum_{i=0}^{\gamma w_M \times \gamma H_M} \mathbb{I}_i^{pt} \quad \text{(Formula 6)}$$

$$\left((RS_i(cl) - GS_i(cl))^2 + \lambda nopt \sum_{i=0}^{\gamma w_M \times \gamma H_M} \mathbb{I}_i^{pt}\left((RS_i(cl) - GS_i(cl))^2\right)\right)$$

$$Seg_{loss} = \frac{\sum_f xy_{loss}^{seg}(f) + c_{loss}^{seg}(f) + cl_{loss}^{seg}(f)}{mf} \quad \text{(Formula 7)}$$

wherein $\lambda pt$ denotes a normalization weight for a positive xy-prediction; $\mathbb{I}_i^{pt}$ denotes a positive point prediction; $\lambda nopt$ denotes a normalization weight for a negative (null value) xy-prediction; $\mathbb{I}_i^{nopt}$ denotes a negative point prediction; $GS_i(cl)=1$; $GS_i(p(c))=1$; mf denotes a batch number; f denotes a frame index.

Figure 8:
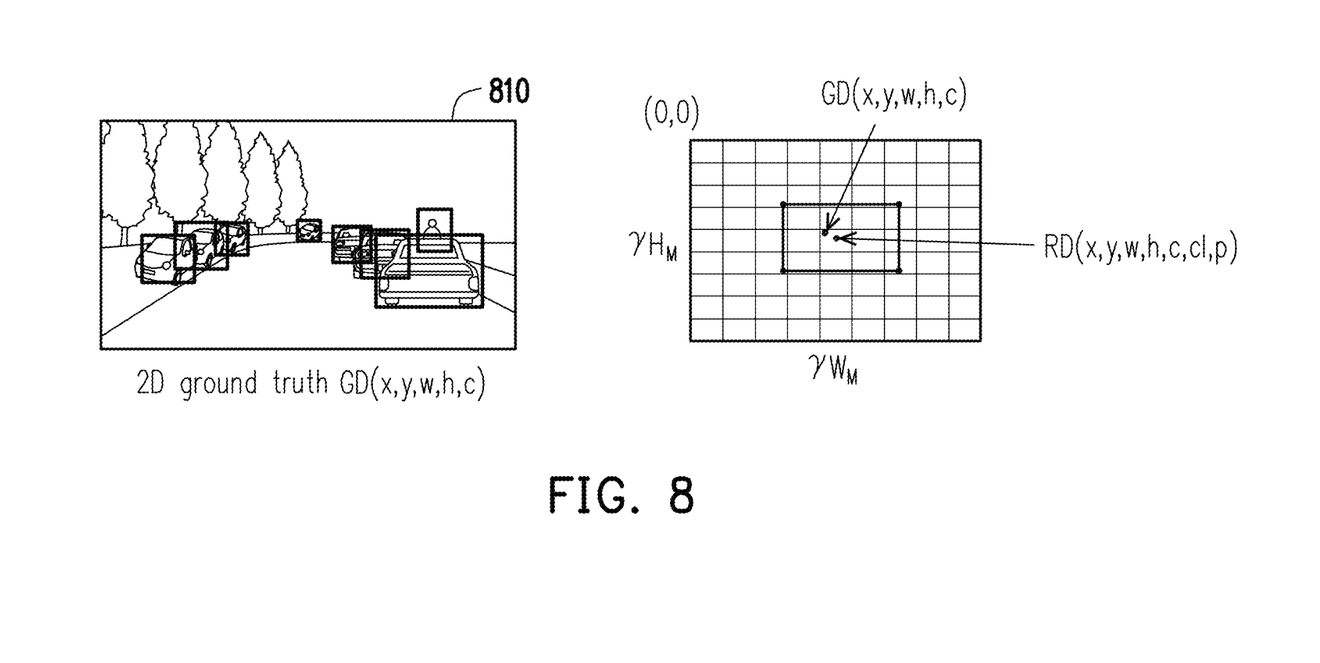
FIG. 8 is a schematic diagram illustrating inputs for a second loss function according to an exemplary embodiment of the disclosure.

FIG. 8 is a schematic diagram illustrating inputs for a second loss function according to an exemplary embodiment of the disclosure.

The backbone architecture module 2004 of the processor 140 can obtain a 2D ground truth 810 from the input image (e.g., the input image 312). According to the 2D ground truth 810 (i.e., GD(x, y, w, h, c)) and the detection box predictions RD(x, y, w, h, c, cl, p) generated by the method shown by FIG. 6, the second loss function (a 2D object detection loss $Obj_{loss}$) can measure an error between the second recognition result (the detection box predictions RD(x, y, w, h, c, cl, p) and the second recognition result (the 2D ground truth 810, i.e., GD(x, y, w, h, c)) corresponding to the second detection task. $Obj_{loss}$ may be obtained through Formula 8 to Formula 12 below.

$$xy_{loss}^{2D} = \lambda xy \quad \text{(Formula 8)}$$

$$\sum_{i=0}^{\gamma w_M \times \gamma H_M} \sum_{j=0}^{A} \mathbb{I}_{ij}^{bb}\left((RD_i(x) - GD_i(x))^2 + ((RD_i(y) - GD_i(y))^2\right)$$

-continued $$wh_{loss}^{2D} = \lambda xy \sum_{i=0}^{\gamma w_M \times \gamma H_M} \sum_{j=0}^{A} \mathbb{1}_{ij}^{bb}$$ (Formula 9)

$$\left( \left( \sqrt{RD_i(w)} - \sqrt{GD_i(w)} \right)^2 + \left( \sqrt{RD_i(h)} - \sqrt{GD_i(h)} \right)^2 \right)$$

$$c_{loss}^{2D} = \sum_{i=0}^{\gamma w_M \times \gamma H_M} \mathbb{1}_{ij}^{bb} \left( \sum_{c \in classes} (RD_i(p(c)) - GD_i(p(c)))^2 \right)$$ (Formula 10)

$$cl_{loss}^{2D} = \sum_{i=0}^{\gamma w_M \times \gamma H_M} \sum_{j=0}^{A} \mathbb{1}_{ij}^{bb} (RD_i(cl) - GD_i(cl))^2 +$$ (Formula 11)

$$\lambda nobb \sum_{i=0}^{\gamma w_M \times \gamma H_M} \sum_{j=0}^{A} \mathbb{1}_{ij}^{nobb} \left( (RD_i(cl) - GD_i(cl))^2 \right)$$

$$Obj_{loss} = \frac{\sum_{f} xy_{loss}^{2D}(f) + wh_{loss}^{2D}(f) +}{mf}$$ (Formula 12)

$$Obj_{loss} = \frac{c_{loss}^{2D}(f) + cl_{loss}^{2D}(f)}{mf}$$

wherein λxy denotes a normalization weight for a positive xy-prediction; $\mathbb{1}_{i,j}^{bb}$ denotes a positive detection prediction; λnobb denotes a normalization weight for a negative (null value) xy-prediction; $\mathbb{1}_{i,j}^{nobb}$ denotes a negative detection prediction; $GD_i(a)$ is 1; $GD_i(p(c))$ is 1; A denotes a total number of boxes; mf denotes a batch number; f denotes a frame index.

In an exemplary embodiment, the processor 140 can configure a plurality of prediction layers in the end-layer network module 2006, and process the shared feature map according to the first loss function corresponding to the first detection task and the second loss function corresponding to the second detection task. In other words, after the processor 140 extracts the shared feature from the image to be recognized (the input image 312) and generates the shared feature map of the first feature maps 420-1, 420-2 and 420-3 and the second feature map 430 through the backbone architecture module 2004, the processor 140 can process the shared feature map according to the first loss function corresponding to the first detection task obtained from Formulas 4 to 7 above and the second loss function corresponding to the second detection task obtained from Formulas 8 to 12 above.

In an exemplary embodiment, the processor 140 can use a plurality of normalization weights to balance a range of loss values of the second detection task to adjust a learnable weight of the backbone architecture module with reference to a range of loss values of the first detection task. For example, after the first loss function (the segmentation loss $Seg_{loss}$) and the second loss function (the 2D object detection loss $Obj_{loss}$) are obtained, a combined loss $Final_{loss}$ may be obtained by using Formula 13 below. The processor 140 can use the combined loss $Final_{loss}$ to adjust a learnable weight of the backbone architecture module 2004.

$$Final_{loss} = Obj_{loss} + \frac{Seg_{loss}}{R} \text{ wherein}$$ (Formula 13)

$$R = \frac{\min_{f} Seg_{loss}(f)}{\min_{f} Obj_{loss}(f)}; \min_{f} Seg_{loss}(f)$$

denotes a minimum segmentation loss when the backbone architecture module 2004 was trained only with the image segmentation detection task;

$$\min_{f} Obj_{loss}(f)$$

denotes a minimum 2D object detection loss when the backbone architecture module was trained only with the 2D object detection task.

In an exemplary embodiment, the processor 140 can use a computer vision technique in the end-layer network module to cluster and connect the recognition result corresponding to the second detection task.

FIG. 9A to FIG. 9D are schematic diagrams illustrating a segmentation map obtained by using a computer vision technique according to an exemplary embodiment of the disclosure.

Figure 9A:
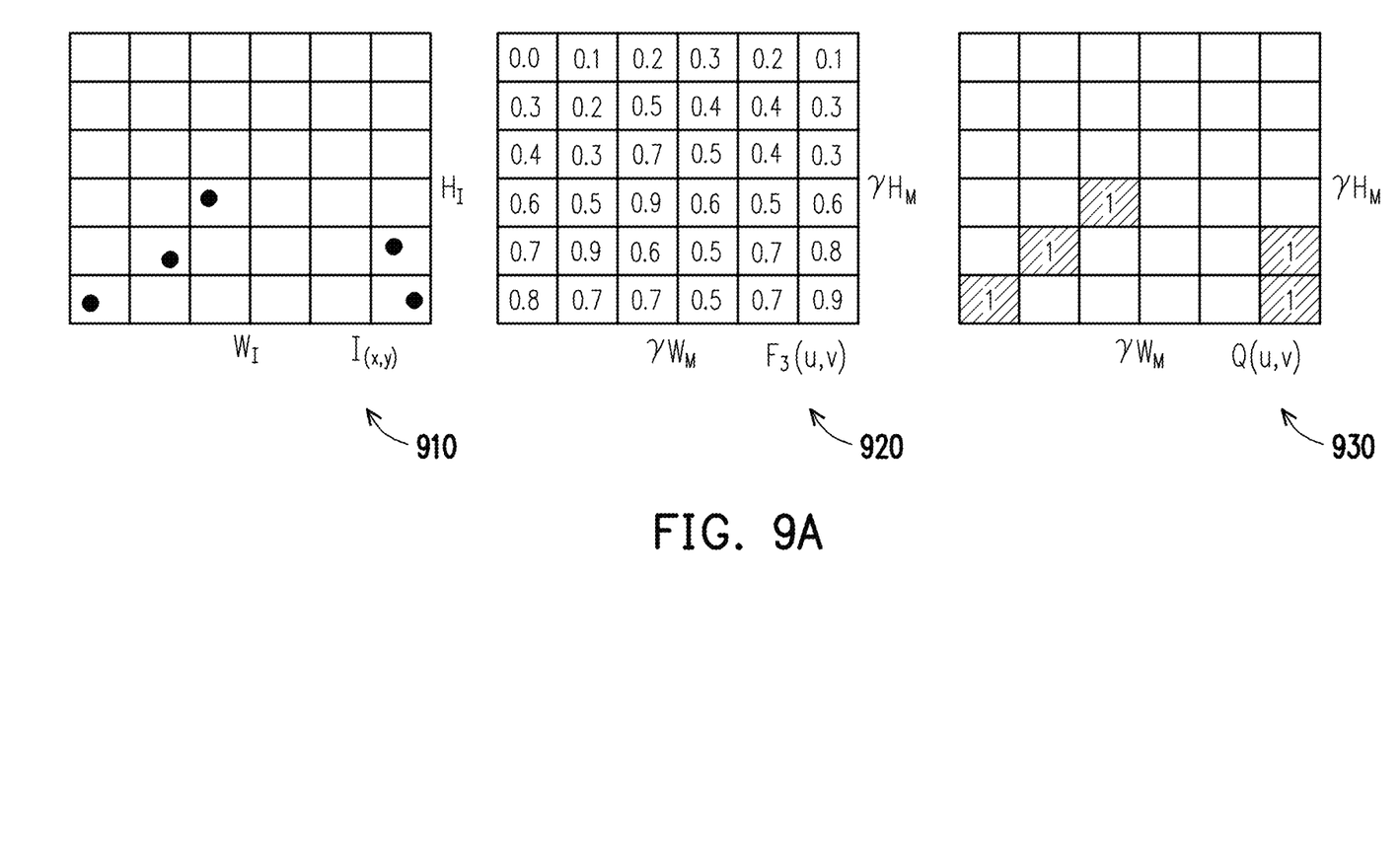
FIG. 9A to FIG. 9D are schematic diagrams illustrating a segmentation map obtained by using a computer vision technique according to an exemplary embodiment of the disclosure.

Referring to FIG. 9A, it is assumed that point candidates $RS^0$(x, y, cl, p) obtained by the method shown in FIG. 6 are point candidates 910 in FIG. 9; the second feature map 430 of the second detection task (the image segmentation) obtain by the method shown in FIG. 4 is a feature map 920 in FIG. 9; and the positive data grid map 520 obtained by the method shown in FIG. 5 is a positive data grid map 930 in FIG. 9. In this exemplary embodiment, the processor 140 can use the computer vision technique to obtain a segmentation map by using the point candidates 910, the feature map 920 and the positive data grid map 930.

In this exemplary embodiment, the operation in which the processor 140 uses the computer vision technique to obtain the segmentation map can be divided into three stages. In the first stage, the processor 140 can recognize a start point $st_{pt}$ and an end point $ed_{pt}$ by using Formula 14 and Formula 15 below.

$$st_{pt} = \left( \min_{b} \mathbb{1}_{b}^{pt} Q_b(u), \max_{a} \mathbb{1}_{a}^{pt} Q_a(v) \right)$$ (Formula 14)

$$ed_{pt} = \left( \max_{b} \mathbb{1}_{b}^{pt} Q_b(u), \max_{a} \mathbb{1}_{a}^{pt} Q_a(v) \right)$$ (Formula 15)

wherein $\mathbb{1}_{a}^{pt}$ denotes positive point predictions, and $\mathbb{1}_{b}^{pt}$ denotes bottom positive point predictions.

In the second stage, the processor 140 continues to find out an order index of the points.

Figure 9B:
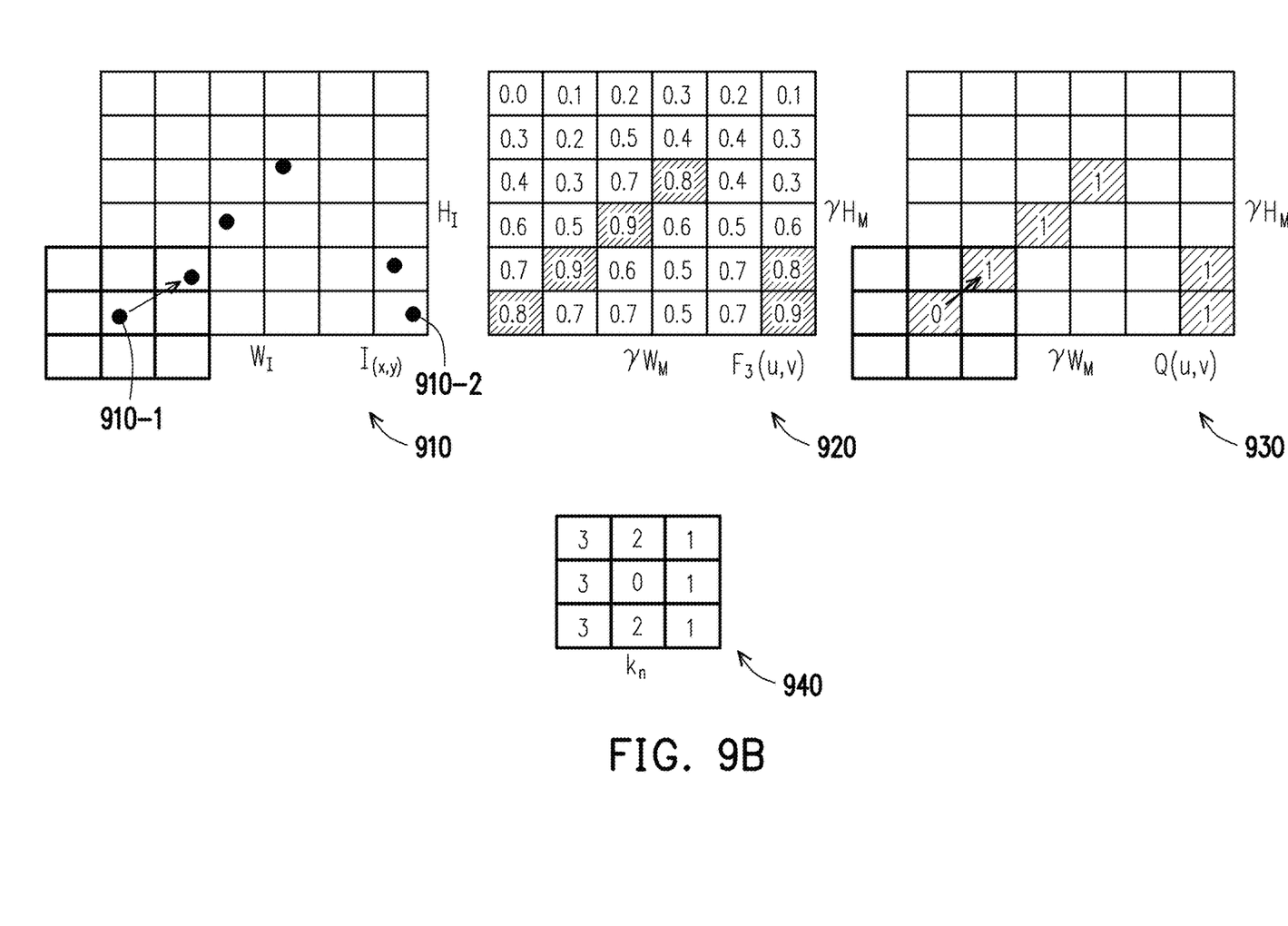
Figure 9C:
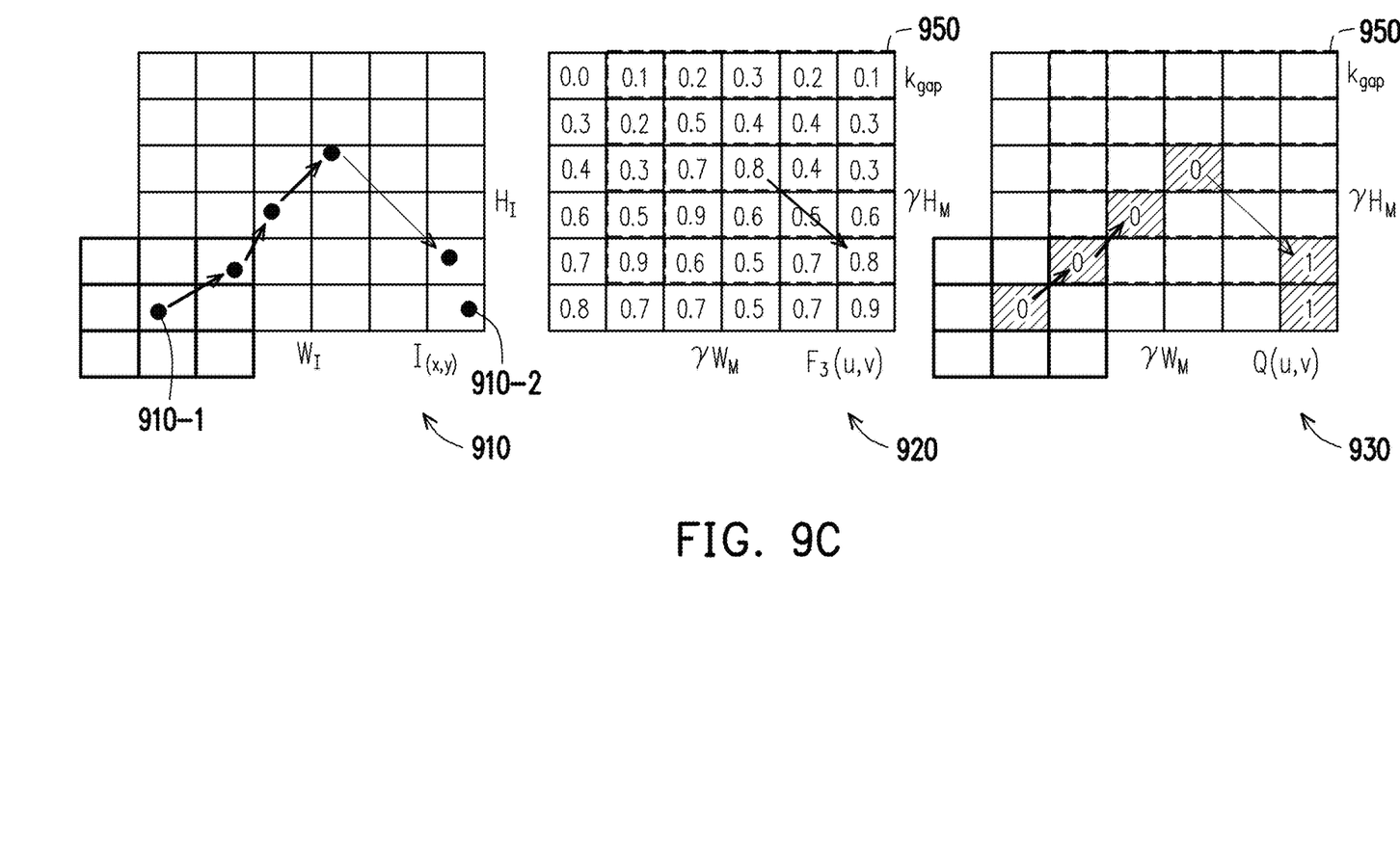

FIG. 9B is a schematic diagram illustrating the second stage for obtaining the segmentation map by using the computer vision technique according to an exemplary embodiment of the disclosure.

Referring to FIG. 9B, it is assumed that the start point $st_{pt}$ obtained in the first stage is a point 910-1, and the end point $ed_{pt}$ obtained in the first stage is a point 910-2. The implementation of the second stage is that, starting from the start point $st_{pt}$ (the point 910-1), a kernel can search whether there are positive cells in the neighboring cells in the positive data grid map 930. Here, the kernel may be a kernel 940 with both length and width being 3 in FIG. 9B, and the Formula 16 and Formula 17 below are used to determine the order index.

$$Q(u_{origin}, v_{origin}) = 0$$ (Formula 16)

$$\max_{-1 \leq i, j \leq 1} k_n(i, j) \times Q(u + i, v + i)$$ (Formula 17)

Starting from the point 910-1, the kernel searches whether there are the positive cells in the neighboring cells in the positive data grid map 930. Here, the kernel may be a kernel 940 with both length and width being 3 in FIG. 9B, and the Formula 16 and Formula 17 below are used to determine the order index.

When the neighboring positive cells cannot be found in the positive data grid map 930 by using the kernel 940 (i.e., $K_n$), another kernel 950 with both length and width being 5 ($K_{gap}$) may be used to search the neighboring cells in the feature map 920 and the positive data grid map 930, and such operation can be expressed by Formula 18 to Formula 20 below.

$$Q(u_{origin}, v_{origin}) = 0, F_3(u_{origin}, v_{origin}) = 0 \quad \text{(Formula 18)}$$

Situation 1

$$\max_{-2 \leq i, j \leq 2} Q(u+i, v+i) > 0 \quad \text{(Formula 19)}$$

$$\min_{-2 \leq i, j \leq 2} \mathbb{1}_{-2 \leq i, j \leq 2}^{pt} \sqrt{(Q(u+i) - Q(u))^2 + (Q(v+j) - Q(v))^2}$$

Situation 2

$$\max_{-2 \leq i, j \leq 2} Q(u+i, v+i) = 0 \quad \text{(Formula 20)}$$

$$\max_{-2 \leq i, j \leq 2} F_3(u+i, v+i)$$

Figure 9D:
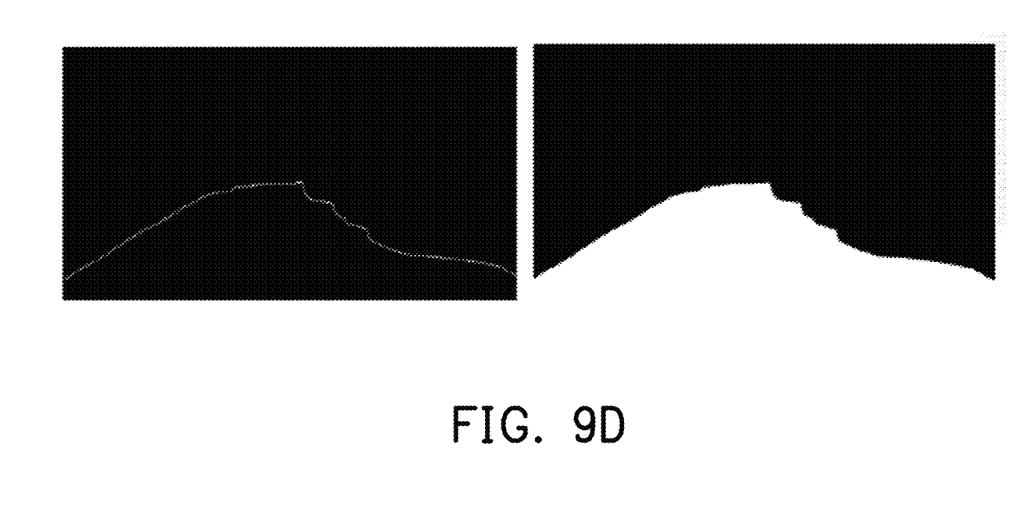

After the second stage is processed, the sorted points may then be used to draw a contour as shown in FIG. 9D to obtain the second recognition result (i.e., an image segmentation result) corresponding to the second detection task (the image segmentation) of the image to be recognized.

Figure 10:
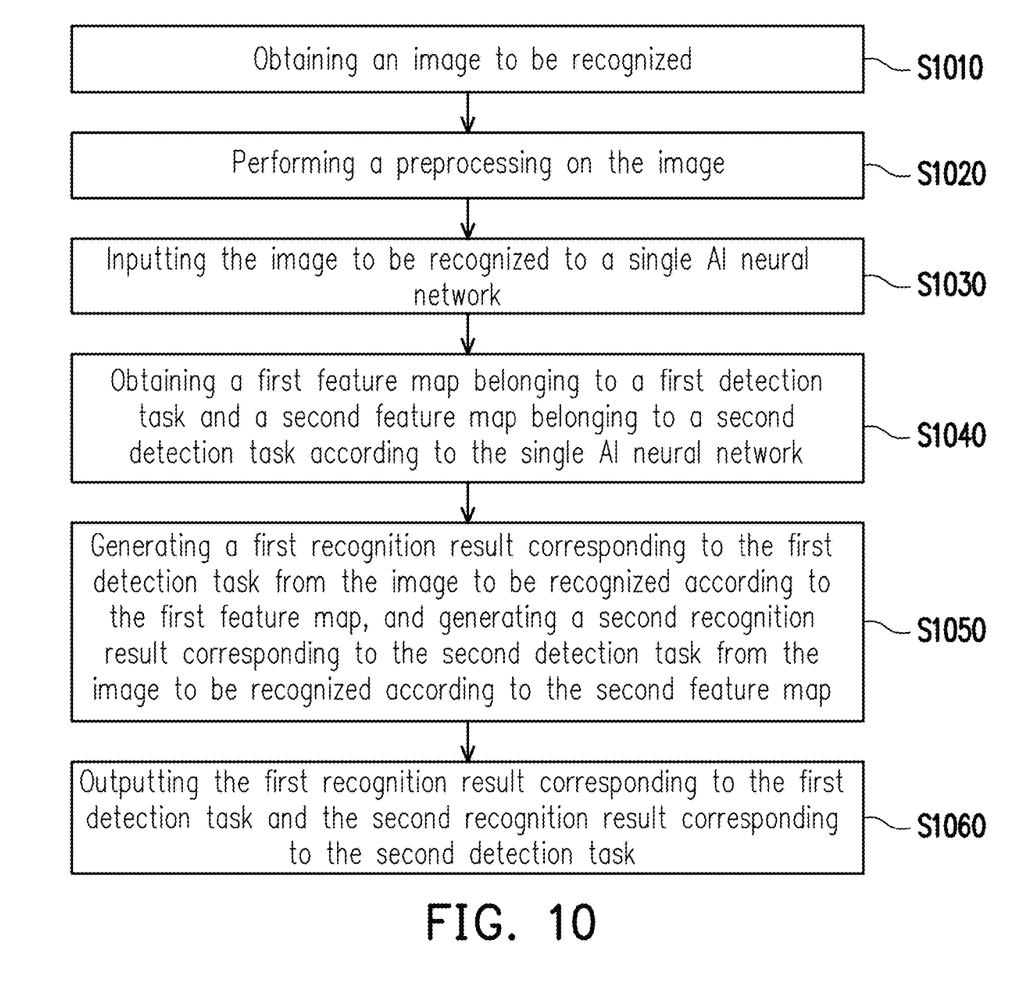
FIG. 10 is a flowchart illustrating an image recognition method according to an exemplary embodiment of the disclosure.

FIG. 10 is a flowchart illustrating an image recognition method according to an exemplary embodiment of the disclosure.

Referring to FIG. 10, in step S1010, the image sensor 110 obtains an image to be recognized.

In step S1020, the processor 140 performs a preprocessing on the image.

In step S1030, the processor 140 can input the image to be recognized (i.e., the input image 312 or the input image 322 in FIG. 3) to a single convolutional neural network. Here, the single convolutional neural network is, for example, the neural network algorithm YOLOv3 (You only look once version 3, YOLO version 3) for image recognition. However, the disclosure does not limit the type of single convolutional neural network used.

Next, in step S1040, the processor 140 obtains a first feature map belonging to a first detection task and a second feature map belonging to a second detection task according to the single convolutional neural network.

In step S1050, the processor 140 can generate a first recognition result (i.e., a 2D object detection result) corresponding to the first detection task (a 2D object detection) from the image to be recognized according to the first feature map (the first feature maps 420-1, 420-2 and 420-3), and generate a second recognition result (i.e., the image segmentation result) corresponding to the second detection task (the image segmentation) from the image to be recognized according to the second feature map (the second feature map 430).

In step S1060, the output device 130 outputs the first recognition result (i.e., the 2D object detection result) corresponding to the first detection task (the 2D object detection) and the second recognition result (i.e., the image segmentation result) corresponding to the second detection task (i.e., the image segmentation).

In summary, the image recognition method and system of the exemplary embodiments of the disclosure can obtain the recognition results of different detection tasks simply by using the single convolutional neural network when there is the shared feature between the feature maps of the different detection tasks. Based on this, the time required for the image recognition can be saved and the accuracy of image recognition can be improved.

Although the present disclosure has been described with reference to the above embodiments, it is apparent to one of the ordinary skill in the art that modifications to the described embodiments may be made without departing from the spirit of the present disclosure. Accordingly, the scope of the present disclosure will be defined by the attached claims not by the above detailed descriptions.

The invention claimed is:

1. An image recognition method for a plurality of detection tasks, the image recognition method comprising:
   obtaining an image to be recognized by an image sensor;
   inputting the image to be recognized to a single convolutional neural network;
   obtaining a first feature map belonging to a first detection task and a second feature map belonging to a second detection task according to an output result of the single convolutional neural network, wherein the first feature map and the second feature map have a shared feature;
   using an end-layer network module to generate a first recognition result corresponding to the first detection task from the image to be recognized according to the first feature map, and to generate a second recognition result corresponding to the second detection task from the image to be recognized according to the second feature map, wherein the end-layer network module uses a computer vision technique to obtain the second recognition result according to the second feature map; and
   outputting the first recognition result corresponding to the first detection task and the second recognition result corresponding to the second detection task.

2. The image recognition method of claim 1, wherein the first detection task is a 2D object detection, and the second detection task is an image segmentation.

3. The image recognition method of claim 1, further comprising:
   configuring a backbone architecture module having a plurality of convolution layers in the single convolutional neural network; and
   using the backbone architecture module to extract the shared feature from the image to be recognized, and to generate a shared feature map.

4. The image recognition method of claim 3, further comprising:
   configuring a first loss function for the first detection task, and configuring a second loss function for the second detection task,
   wherein the first loss function measures an error between the first recognition result and a first reference result corresponding to the first detection task,
   wherein the second loss function measures an error between the second recognition result and a second reference result corresponding to the second detection task.

5. The image recognition method of claim 4, further comprising:
configuring a plurality of prediction layers in the end-layer network module, and processing the shared feature map according to the first loss function corresponding to the first detection task and the second loss function corresponding to the second detection task.

6. The image recognition method of claim 4, further comprising:
using a plurality of normalization weights to balance a range of loss values of the second detection task to adjust a learnable weight of the backbone architecture module with reference to a range of loss values of the first detection task.

7. The image recognition method of claim 1, further comprising using the computer vision technique in the end-layer network module to cluster and connect the second recognition result corresponding to the second detection task.

8. The image recognition method of claim 1, wherein the first feature map of the first detection task comprises coordinates of a bounding box, a width and a height of the bounding box, a detection confidence level of the bounding box and a class probability of the bounding box, and the second feature map of the second detection task comprises the coordinates of the bounding box, the detection confidence level of the bounding box and the class probability of the bounding box.

9. An image recognition system, comprising:
an image sensor, obtaining an image to be recognized;
a storage device;
an output device; and
a processor, coupled to the image sensor, the storage device and the output device, wherein the processor inputs the image to be recognized to a single convolutional neural network, wherein the storage device stores the single convolutional neural network,
wherein the processor obtains a first feature map belonging to a first detection task and a second feature map belonging to a second detection task according to an output result of the single convolutional neural network, wherein the first feature map and the second feature map have a shared feature,
wherein the processor uses an end-layer network module to generate a first recognition result corresponding to the first detection task from the image to be recognized according to the first feature map, and to generate a second recognition result corresponding to the second detection task from the image to be recognized according to the second feature map, wherein the processor uses the end-layer network module to use a computer vision technique to obtain the second recognition result according to the second feature map,
wherein the output device outputs the first recognition result corresponding to the first detection task and the second recognition result corresponding to the second detection task.

10. The image recognition system of claim 9, wherein the first detection task is a 2D object detection, and the second detection task is an image segmentation.

11. The image recognition system of claim 9, wherein the processor configures a backbone architecture module having a plurality of convolution layers in the single convolutional neural network,
wherein the processor uses the backbone architecture module to extract the shared feature from the image to be recognized, and to generate a shared feature map.

12. The image recognition system of claim 11, wherein the processor configures a first loss function for the first detection task, and configures a second loss function for the second detection task,
wherein the first loss function measures an error between the first recognition result and a first reference result corresponding to the first detection task,
wherein the second loss function measures an error between the second recognition result and a second reference result corresponding to the second detection task.

13. The image recognition system of claim 12, wherein the processor configures a plurality of prediction layers in the end-layer network module, and processes the shared feature map according to the first loss function corresponding to the first detection task and the second loss function corresponding to the second detection task.

14. The image recognition system of claim 12, wherein the processor uses a plurality of normalization weights to balance a range of loss values of the second detection task to adjust a learnable weight of the backbone architecture module with reference to a range of loss values of the first detection task.

15. The image recognition system of claim 9, wherein the processor uses the computer vision technique in the end-layer network module to cluster and connect the second recognition result corresponding to the second detection task.

16. The image recognition system of claim 9, wherein the first feature map of the first detection task comprises coordinates of a bounding box, a width and a height of the bounding box, a detection confidence level of the bounding box and a class probability of the bounding box, and the second feature map of the second detection task comprises the coordinates of the bounding box, the detection confidence level of the bounding box and the class probability of the bounding box.

* * * * *